United States Patent
Herigstad et al.

(10) Patent No.: US 6,731,316 B2
(45) Date of Patent: *May 4, 2004

(54) GRAPHICAL LAYOUT AND KEYPAD RESPONSE TO VISUALLY DEPICT AND IMPLEMENT DEVICE FUNCTIONALITY FOR INTERACTIVITY WITH A NUMBERED KEYPAD

(75) Inventors: Dale A. Herigstad, Hollywood, CA (US); Harry B. Kargman, Brookline, MA (US)

(73) Assignee: Kargo, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/513,831

(22) Filed: Feb. 25, 2000

(65) Prior Publication Data

US 2003/0169282 A1 Sep. 11, 2003

(51) Int. Cl.⁷ .............................. G09G 5/00; H04M 1/00
(52) U.S. Cl. ........................ 345/864; 345/810; 455/566
(58) Field of Search ................. 455/550, 566, 455/575, 556.1, 556.2, 899; 345/864, 760, 764, 810

(56) References Cited

U.S. PATENT DOCUMENTS

| | | | |
|---|---|---|---|
| 5,445,524 A | * | 8/1995 | Jones ........................ 434/153 |
| 5,543,818 A | | 8/1996 | Scott ........................ 345/168 |
| 5,633,912 A | | 5/1997 | Tsoi ........................... 379/58 |
| 5,796,394 A | * | 8/1998 | Wicks et al. ................. 345/751 |
| 5,963,861 A | * | 10/1999 | Hanson ....................... 455/422 |
| 6,016,142 A | | 1/2000 | Chang et al. |
| 6,046,732 A | * | 4/2000 | Nishimoto ................... 345/168 |
| 6,195,569 B1 | | 2/2001 | Frederiksen ................. 455/566 |
| 6,240,360 B1 | * | 5/2001 | Phelan ........................ 345/641 |
| D450,689 S | | 11/2001 | Langford et al. .......... D14/247 |
| D451,502 S | | 12/2001 | Vuolteenaho et al. ...... D14/247 |
| 6,363,419 B1 | * | 3/2002 | Martin et al. ............... 709/219 |
| 6,424,355 B2 | * | 7/2002 | Watanabe et al. ........... 345/163 |
| 2001/0017634 A1 | | 8/2001 | Scott .......................... 345/767 |
| 2001/0041599 A1 | | 11/2001 | Pirkola et al. .............. 455/566 |

FOREIGN PATENT DOCUMENTS

EP    883 055 A2    9/1998

* cited by examiner

*Primary Examiner*—John Cabeca
*Assistant Examiner*—Brian Detwiler
(74) *Attorney, Agent, or Firm*—Lahive & Cockfield, LLP; Kevin J. Canning, Esq.

(57) ABSTRACT

A visual display for an electronic device is partitioned into regions. Each of the regions is associated with a key on a keypad. One exemplary implementation is a 3×3 grid of regions corresponding to nine keys numbered 1–9 on a numbered keypad. A visual correspondence is provided for the user to associate choices illustrated in the regions with the numbered keys. The regions display visual information such as graphics and/or text to identify a selection option. The keys are associated with the regions such that when a key is selected the selection option associated with the region is chosen. In this fashion, a user may navigate through content, such as content from the Internet, to gain accesses to service, to obtain information and to purchase items.

39 Claims, 18 Drawing Sheets

GRAPHICAL LAYOUT AND KEYPAD RESPONSE TO VISUALLY DEPICT AND IMPLEMENT DEVICE FUNCTIONALITY FOR INTERACTIVITY WITH A NUMBERED KEYPAD

TECHNICAL FIELD

The present invention relates generally to communication devices and more particularly to a graphical layout and keypad response to visually depict and implement device functionality for interactivity with a numbered keypad on an electronic device.

BACKGROUND OF THE INVENTION

Internet access has traditionally been realized through computer systems, such as personal computer (PC) systems that include a video display, a full keyboard and a mouse. With such computer systems, users may navigate the Internet by entering text with the keyboard or by manipulating the mouse. As a result, users have become accustomed to navigating the net using a keyboard and a mouse. Unfortunately, full keyboards and mouse are not found on many of the newly emerging devices for accessing the Internet. For example, mobile phones typically have a small screen displays (such as an LCD display), rather than a full keyboard. Other devices that may be used to access the Internet also have such limitations. These limitations make it difficult for users to access content on the Internet with these devices and to navigate through content that is available on the Internet.

SUMMARY OF THE INVENTION

The present invention addresses the limitations of the prior art by providing a paradigm for more easily navigating content, such as with the Internet and more generally for use with wireless applications. This paradigm is especially well adapted for use with mobile phones. In one embodiment of the present invention, visual information is displayed on the display of an electronic device, such as a mobile phone. The display is logically partitioned into distinct regions. These regions may have borders that visually delimit the regions from each other. Each of the regions is associated with one of the keys on the keypad of the device. The visual information represents a selection option that a user may select by pressing the key that is associated with the region. Once the key is selected, an event may be triggered that is appropriate for the chosen option. The layout of the regions may correspond with the geometric layout of the keys. Alternatively, the regions may contain visual cues (e.g. numbers) of the associated keys.

In one application of the present invention, a map is displayed on the display of the electronic device. The map is partitioned into nine regions corresponding with nine numbered keys on the keypad of the device. When a user selects one of the numbered keys, the user requests more detail regarding the region on the map that is associated with the numbered key. After the user selects the numbered key, a more detailed map of the associated region is displayed on the display. This more detailed map may also be partitioned into regions associated with keys on the keypad. Selection of one of the keys produces an even more detailed map of the associated region. In this fashion, a user may iteratively locate particular sites, such as a purveyor of services, a seller of goods, an automatic teller machine, or other type of facility.

It should be appreciated that the above example of the map is only one of many possible applications of the present invention. As will be described in more detail below, the present invention may also be applied to obtain information, obtain services, purchase goods, etc. Moreover, it should be appreciated that the present invention is not limited to application to mobile phones but rather is more generally applicable to devices that have a limited set of keys on a keypad and a display.

In accordance with one aspect of the present invention, a method is practiced in an electronic apparatus having a display and a numbered keypad with keys. Visual information is displayed on the display in sections. Each section is associated with a respective one of the keys on the numbered keypad. Each section provides a visual indication of the selection associated with selecting the key on the numbered keypad. An event is triggered in response to the selection of one of the keys in the numbered keypad. The sections may contain text, graphical information and/or a combination thereof. The electronic apparatus may take many forms including but not limited to a telephone, a mobile phone, a pager, a personal digital assistant (PDA), interactive television system or an Internet appliance. The event that is triggered may include the display of additional information on the display, the placing of a telephone call or other activities.

In accordance with another aspect of the present invention, information is displayed on the display of a mobile telephone having a numbered keypad containing keys. The display is visually partitioned into at least two regions wherein each region is associated with a respective one of the keys on the number keypad and each section represents a choice of an option that may be selected by selecting the associated key. The regions are organized on the display in a configuration that corresponds to a configuration of the keys on the numbered keypad. Thus, there is a visually intuitive correspondence between the regions and the keys on the keypad. An action is taken in response to the selection of a selected one of the keys on the number keypad. Each region may be associated with a service option, such as the selection of the key results in a request for the service.

In accordance with a further aspect of the present invention, navigation options are output on an output device to generate a first output. Each output option occupies a portion of the output that correlates to one of the numbered buttons on the electronic device. The output options are patterned on the first output to correspond to a physical layout of the numbered buttons. When a user of the electronic device selects one of the numbered buttons, a new set of navigation options are output on the output device. These new navigation options are associated with a selected button. The new navigation options are pattered to correspond with the physical layout of the numbered buttons and each option is correlated with one of the numbered buttons.

In accordance with an additional aspect of the present invention, a first map of a geographic area is displayed on a display of an electronic device. The first map contains a site that a party wishes to locate. The map is partitioned into visually delimited regions and each region corresponds to a respective one of the numbered keys. Upon a user selecting a selected one of the numbered keys, a second map is displayed on the display. The second map depicts the region of the first map that corresponds to the selected one of the numbered keys. The second map contains more detail on the region.

In accordance with yet another aspect of the present invention, visual representations of services are displayed in respective regions of a display on electronic device. Each of the regions corresponds to the respective key on a numbered keypad in the electronic device. The regions are patterned in a geometric configuration corresponding to the geometric configuration of the keys on the numbered keypad. In response to a user of the electronic device selecting a selected one of the keys, information is displayed on the display to enable the user to request a given service that is visually represented by the region that corresponds with the selected key.

BRIEF DESCRIPTION OF THE DRAWINGS

An illustrative embodiment consistent with the principles of the present invention will be described below relative to the following drawings.

DETAILED DESCRIPTION OF THE INVENTION

The illustrative embodiment of the present invention provides an approach for organizing visual information for display on electronic devices so as to provide a visually intuitive interface for assisting a user in interacting with the device. The visual display is configured to be especially useful in assisting a user in navigating through hierarchical layers of content. The illustrative embodiment may be used in a number of different types of electronic devices, as will be described in more detail below. The illustrative embodiment provides a mechanism for easing access to content, such as that available over the Internet.

The illustrative embodiment logically partitions a display into visually delimited regions. The regions may be separated by explicit borders or by delimiting space. Each region is associated with keys or buttons on the associated electronic device. Each region may represent a selection choice and may provide information regarding the selection choice. When a user selects the key or button that is associated with a given selection choice, events may be triggered so as to take actions associated with the choice. For example, the selection of a choice may cause a new display to be shown on the display where the new display contains additional information or choices regarding the selected choice.

The illustrative embodiment has applicability to a number of different applications. Some example applications will be described in more detail below. For example, the illustrative embodiment may be employed to locate goods, services or other desired sites by iteratively stepping through successively more detailed maps to locate the desired entity. Furthermore, the illustrative embodiment may be used to gain access to goods or services.

Figure 1:
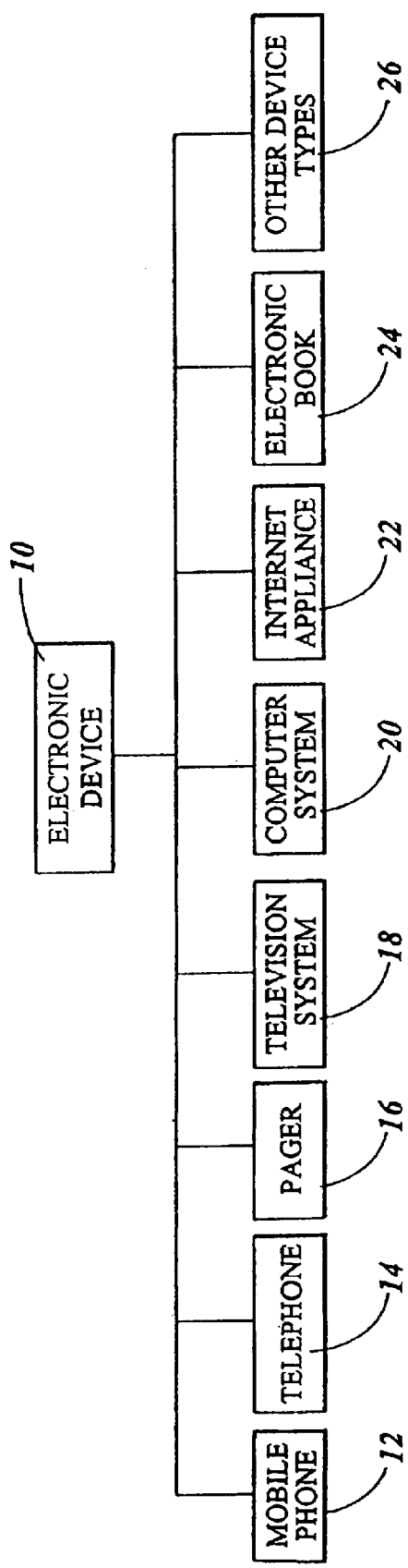
FIG. 1 depicts a number of different options for an electronic device to be used in the illustrative embodiment of the present invention.

As was mentioned above, the illustrative embodiment is practiced with a number of different types of electronic devices. FIG. 1 depicts a number of the different options that are available for practicing the illustrative embodiment. As is shown in FIG. 1, the electronic device may be a mobile phone 12, such as a cellular phone. The electronic device 10 may also be a conventional telephone 14 that communicates over land lines. The electronic device 10 may be a pager 16. The electronic device 10 may be a television system 18 such as the combination of a remote control with a settop box and television. The electronic device 10 may be a computer system 20, such as a network computer, personal computer or other type of device. The electronic device 10 may be an Internet appliance 22, an electronic book 24 or other device type 26. The depiction of examples of electronic devices in FIG. 1 is intended to be merely illustrative and not limiting of the present invention. The present invention may more generally be practiced with instances where there is a visual output device and an associated subset of keys or buttons.

Figure 2A:
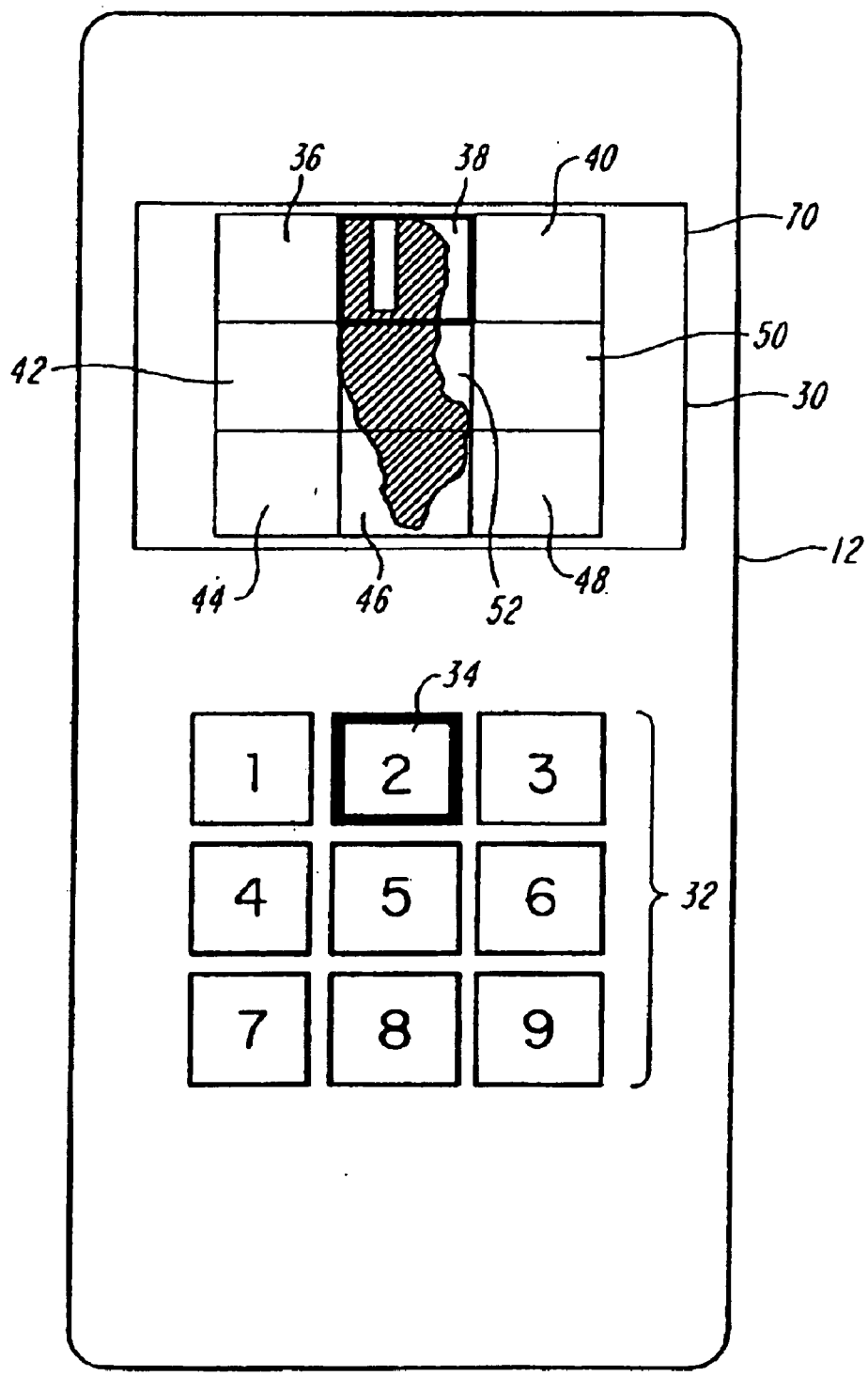
FIG. 2A depicts an example of an application of the illustrative embodiment for navigation of a map on a mobile phone.

FIG. 2A shows an example of a mobile phone 12 for practicing the illustrative embodiment of the present invention. The mobile phone 12 includes a display 30 and a keypad 32. The keys on the keypad 32 are numbered 1–9. The display 30 shows visual information that is logically partitioned into regions or sections 36, 38, 40, 42, 44, 46, 48, 50 and 52. Each of the regions or sections is correlated or associated with one of the keys on the keypad 32. For example, region 38 is associated with key 34. The geometric configuration or physical layout of the regions 36–52 corresponds to the geometric configuration and physical layout of the keys on the keypad 32. In the example depicted in FIG. 2A, each of the regions is visually delimited from the other by a border. Those skilled in the art will appreciate that there also may be instances where the regions are not visually delimited by borders but rather are delimited by space or by other delimiting mechanisms.

In the example depicted in FIG. 2A, each region displays graphical information without displaying text. Those skilled in the art will appreciate that text may also be displayed in the regions. This text may include numbers that directly associate the regions with the associated numbered keys on the keypad 32.

Figure 2B:
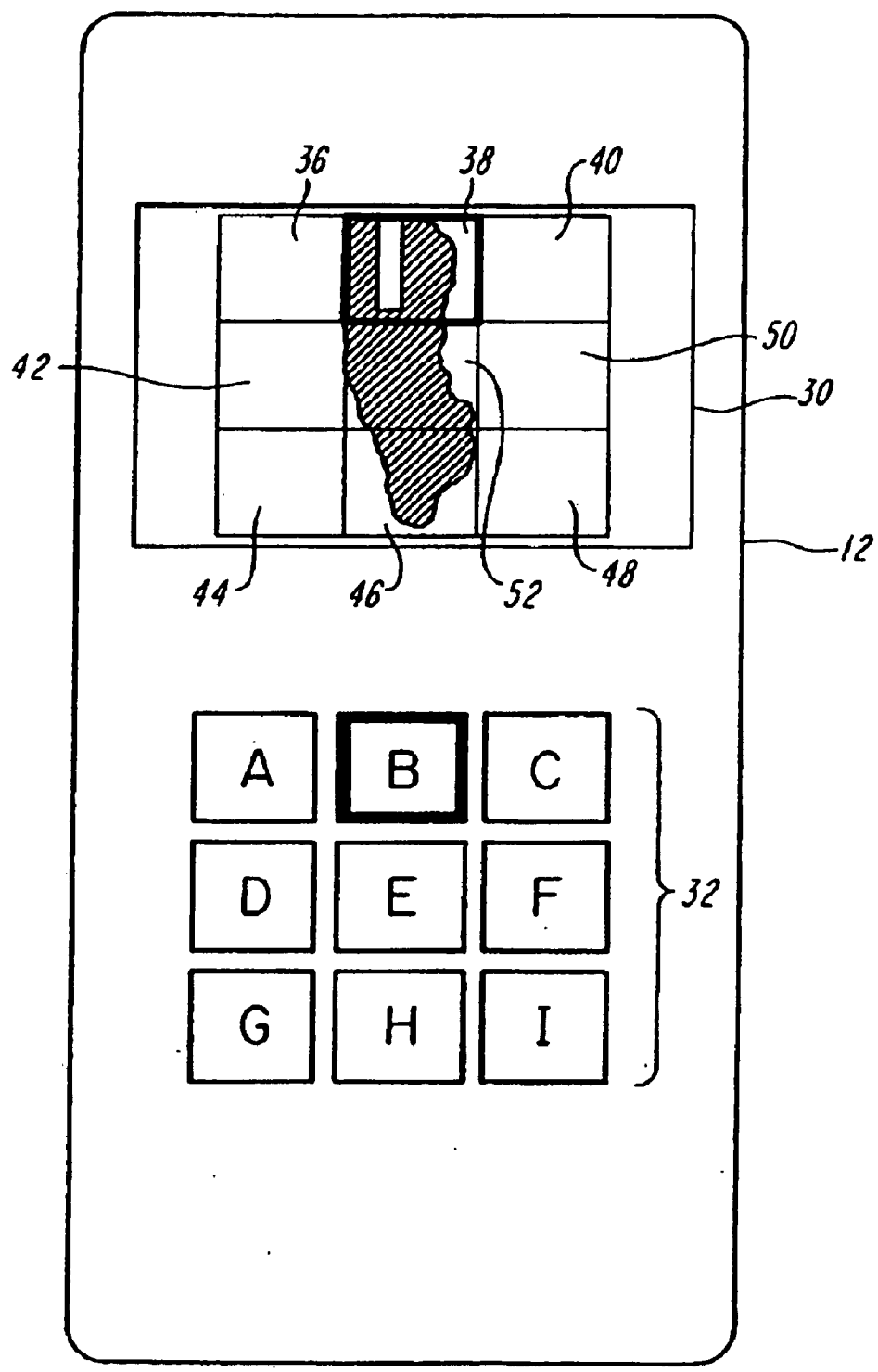
FIG. 2B illustrates an example wherein a keypad is not numbered but rather is sequenced with letters.

As shown in FIG. 2B, the present invention is not limited to instances where a numbered keypad is utilized. The keypads may also associated with other varieties of characters, such a letters as depicted in FIG. 2B. Those skilled in the art will appreciate that the characters may include punctuation marks or other varieties of characters.

Still further, the keys on the keypad may not be associated with characters per se but rather may include functional keys (e.g. ctrl, alt, shift, F1, etc.).

Figure 2C:
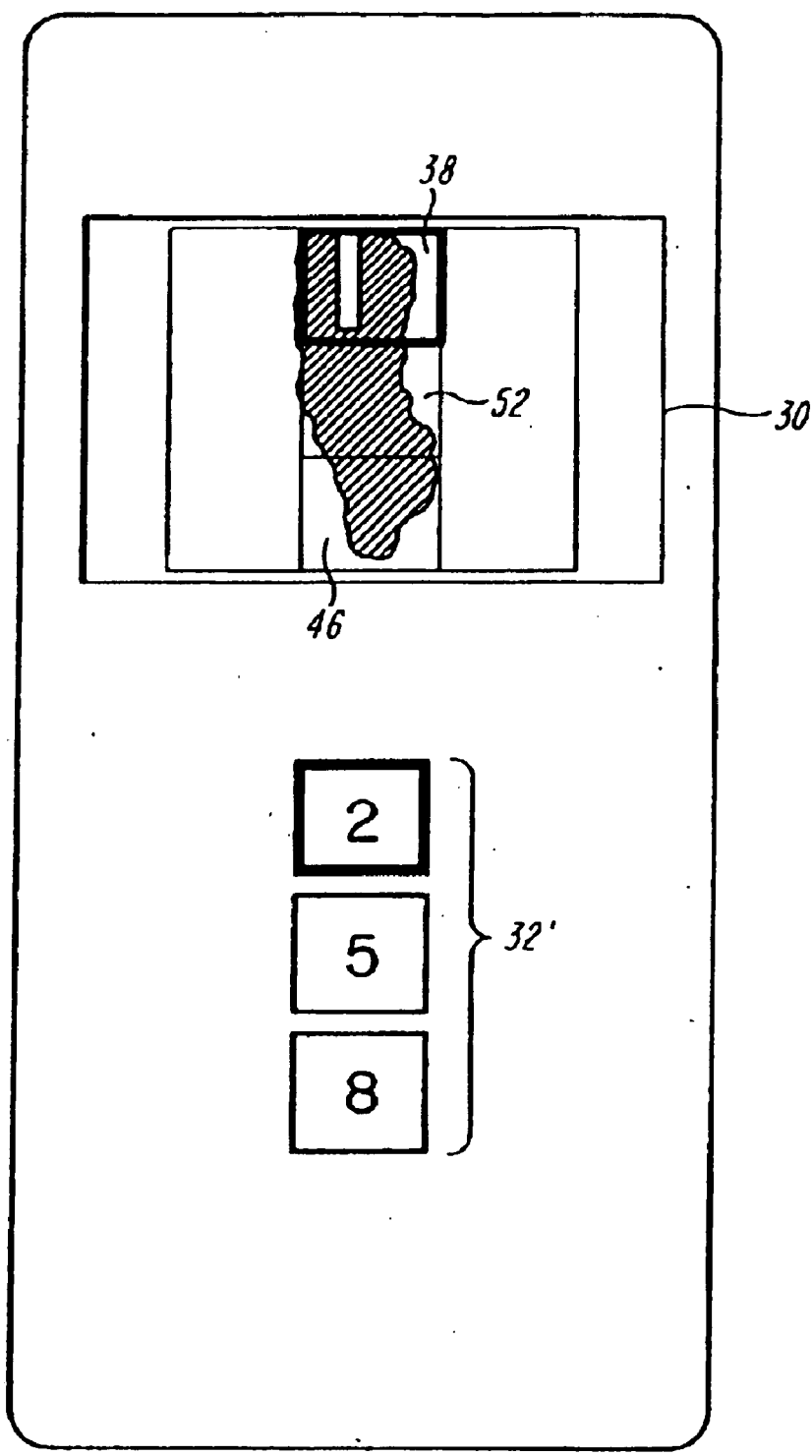
FIG. 2C shows an example wherein only a subset of the keys in the keypad are associated with regions

It should be appreciated that there may be fewer regions than keys in the keypad. In the example depicted in FIG. 2C, the display 30 for the mobile phone is partitioned solely into three regions 38, 46 and 52 which are associated with the keys 2, 8 and 5, respectively. The remaining keys are not depicted in FIG. 2C but may be present on the keypad 32. The active subset of key 32' is shown in FIG. 2C.

Figure 3:
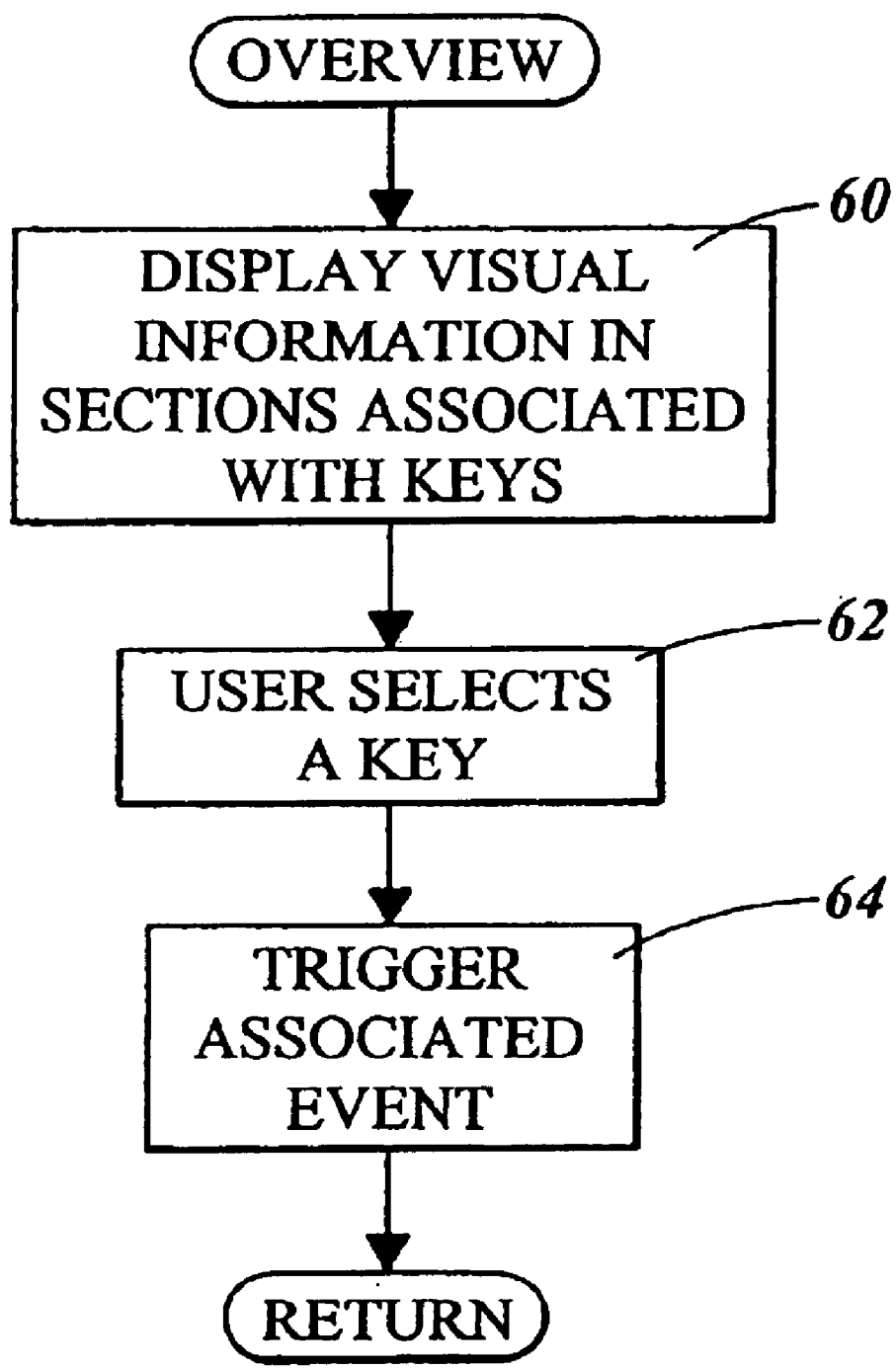
FIG. 3 is a flow chart illustrating the steps that are performed when a user selects a key in accordance with the illustrative embodiment.

FIG. 3 is a flow chart that provides an overview of the steps performed in a single iteration of operation in the illustrative embodiment. In general, visual information is displayed in sections on a display on an electronic device where the sections are associated with keys (step 60 in FIG. 3). The visual information may provide a visual indication of the event or activity associated with selection on the key. The user then selects a key (step 62 in FIG. 3). The electronic device contains hardware or software logic for triggering an associated event when the key is depressed (step 64 in FIG. 3). The triggering of the event may include multiple types of events such as the display of additional information. For the example case of a mobile phone, the event may include the placing of a telephone call, submitting a form or a request to a remote computing resource, etc. The illustrative embodiment is not intended to be limited to a particular event or subset of events that are triggered. The events are largely dependent upon the application.

An example is helpful to illustrate operation of the illustrative embodiment. FIG. 2A shows an initial map 70 on the display 30 of a mobile phone 12. An example of the use of the cellular phone 12 for the case shown in FIG. 2A will be described below relative to the flow chart of FIG. 5. Initially, the location of the user must be determined (step 100 in FIG. 5). The location of the user may be determined in multiple ways. In a first case, the mobile phone service provider knows the cell in which the user is currently present in this information may be used to determine a geographic location. Appropriate information may be gathered from the database at a server and forwarded to the cellular phone 12 so that the proper map 70 is initially displayed. In addition, another alternative is to gather the ANI (automatic number identification) for a call originating from the mobile phone 12 to initiate Internet access. The ANI will contain an area code and the area code can be mapped to a given geographic location. A third alternative is to use a global positioning (GPS) mechanism that is built into the mobile phone 12 to locate the user and the mobile phone 12. The configuration of other components employed with the mobile phone 12 will be described in more detail below. Once the location of the user is determined images may be retrieved for the geographic location associated with the user and forwarded to the mobile phone 12 (step 102 in FIG. 5). This high level map is displayed on the display 30 of the mobile phone 12 (step 104 in FIG. 5).

Figure 4A:
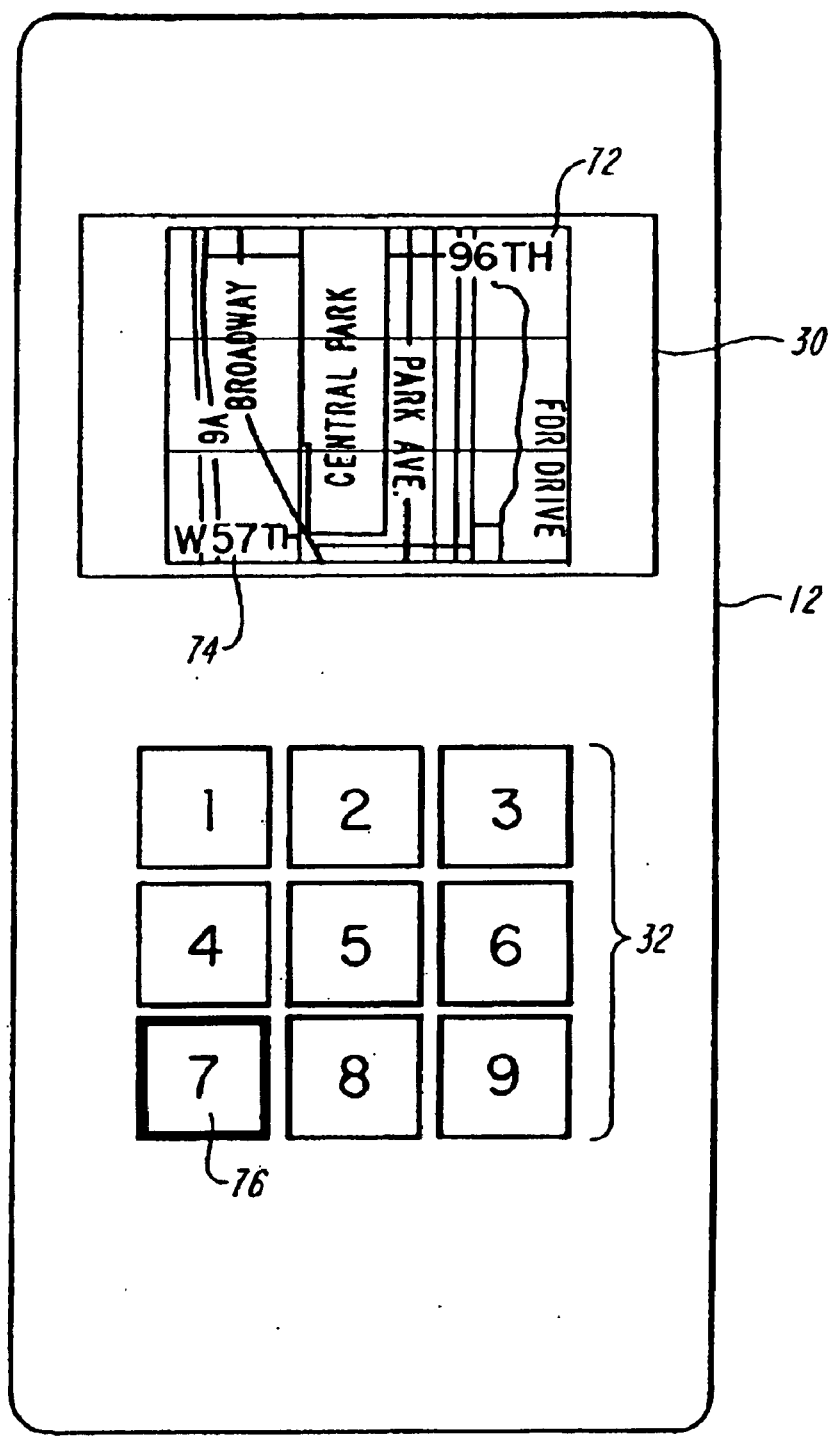
FIGS. 4A–4D illustrate an example of Internet navigation through successively more detailed maps in accordance with the illustrative embodiment.

Suppose in the example case depicted in FIG. 2A that the user selects the two button 34. The two button 34 is associated with region 38 which represents a northern portion of Manhattan in the map 70 shown in FIG. 2A. The mobile phone 12 receives the user selection (step 106 in FIG. 5) and then must take steps to display the next level of the map (step 108 in FIG. 5). The mobile phone 12 may have cached the next level of the map and may retrieve the next level of the map from local memory or may submit a request out over the wireless network to a server that contains the map. FIG. 4A shows an example of the next level map 72 that result from depressing the two button 34 of FIG. 2A. As can be seen, the map 72 has more detail and shows the region 38 with a finer resolution so that streets are visible and street names are contained in the display. It is also noteworthy that this additional display is also partitioned into 9 regions that correspond with the 9 keys on the keypad 32.

Figure 4B:
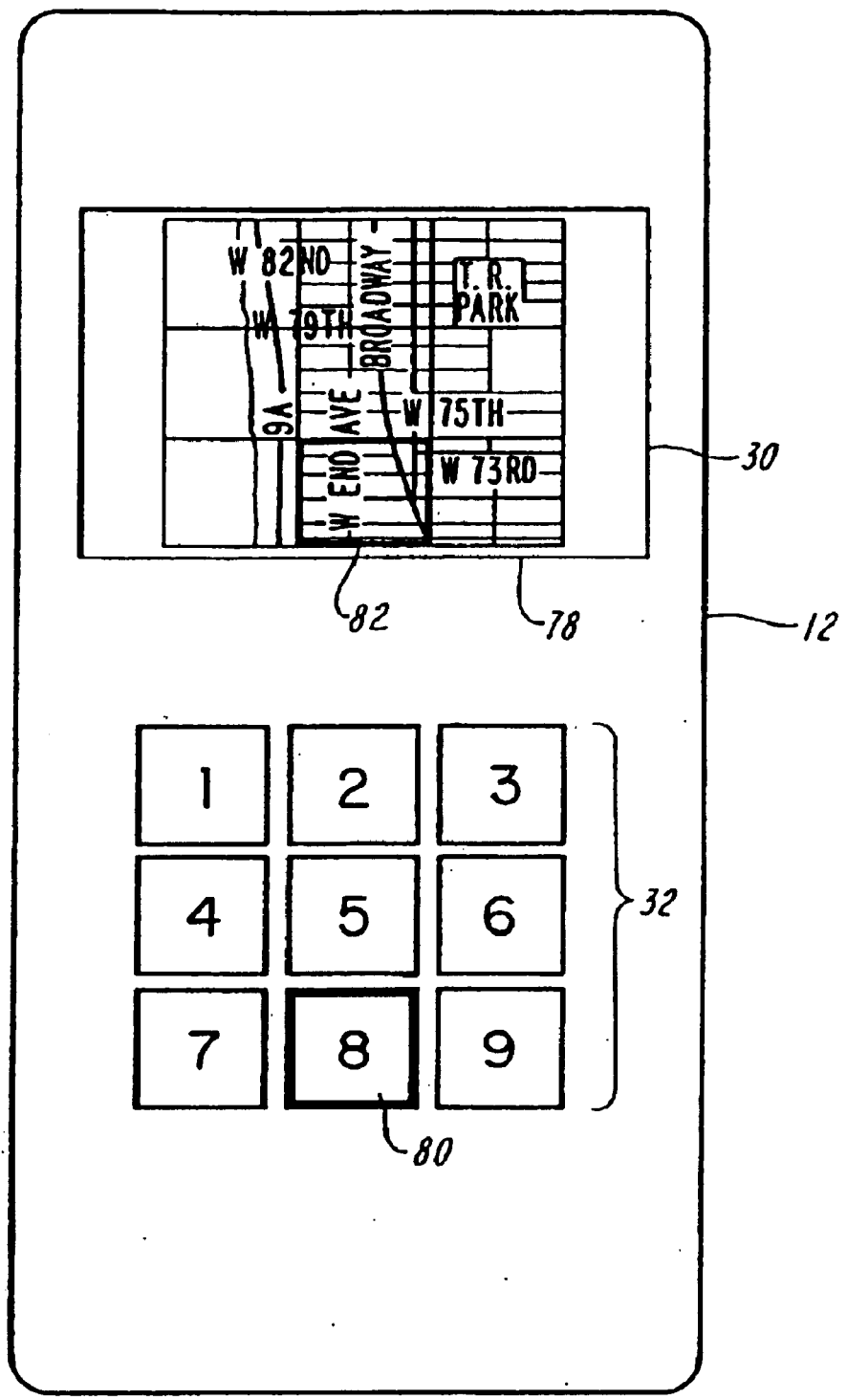
Figure 4C:
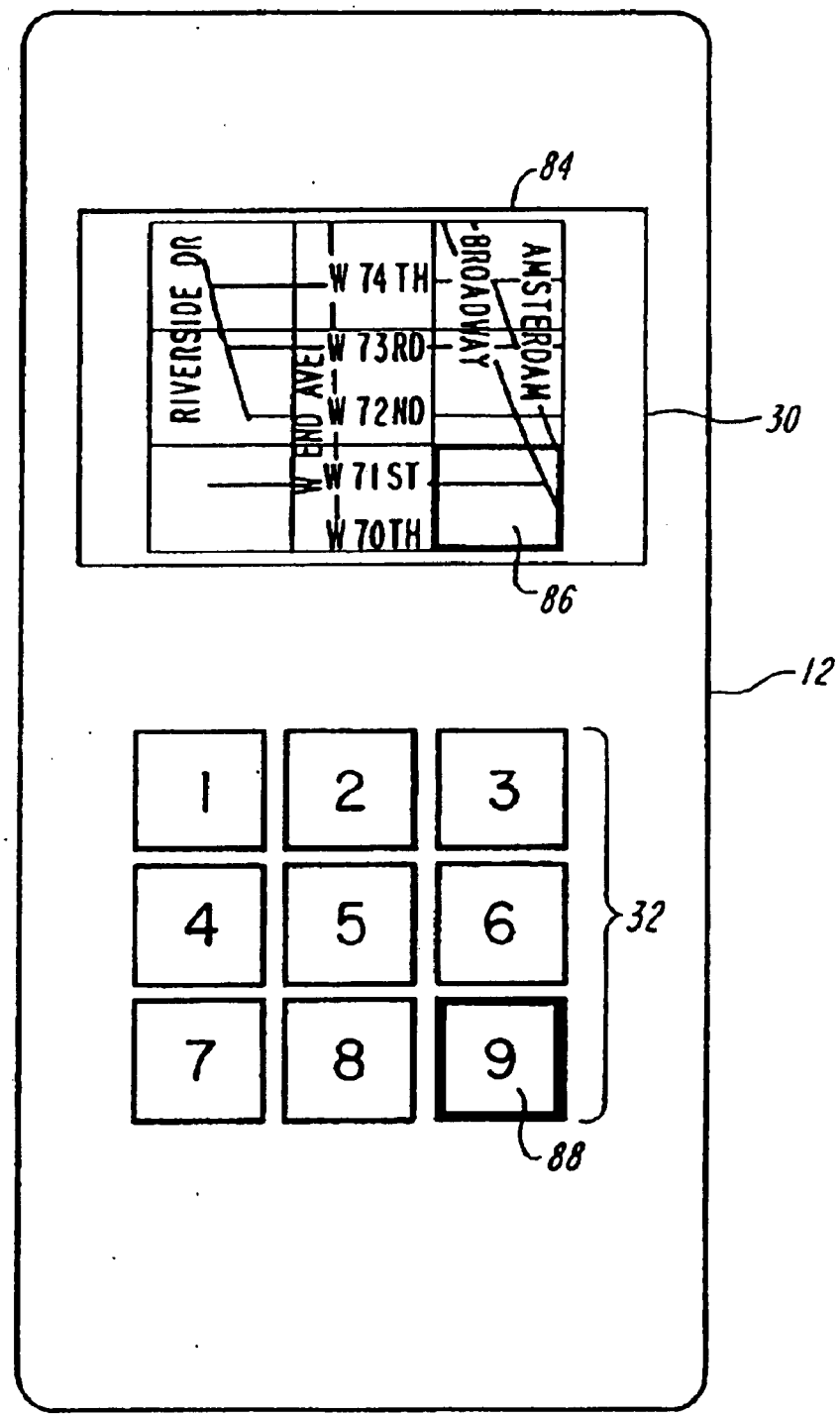
Figure 4D:
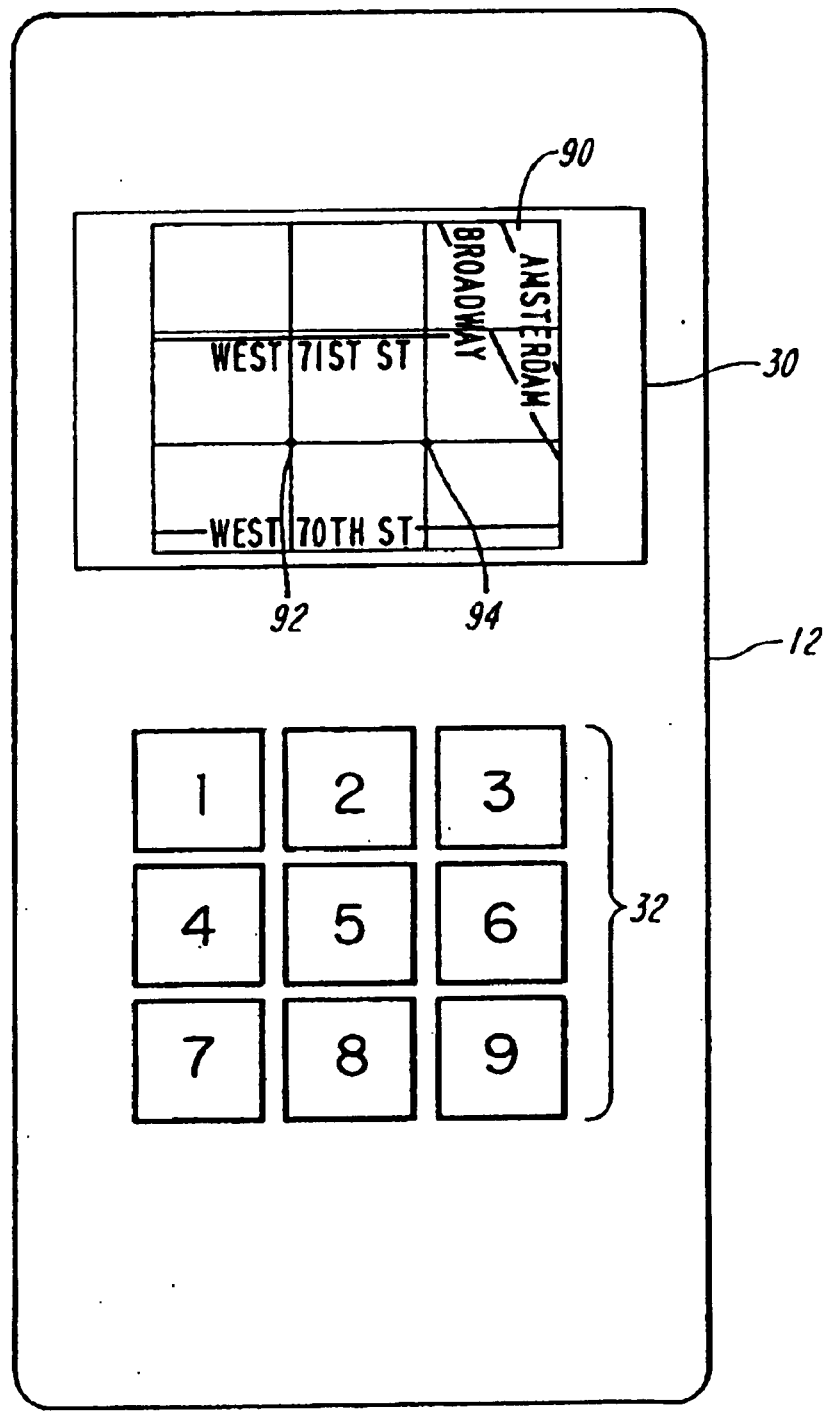
Figure 5:
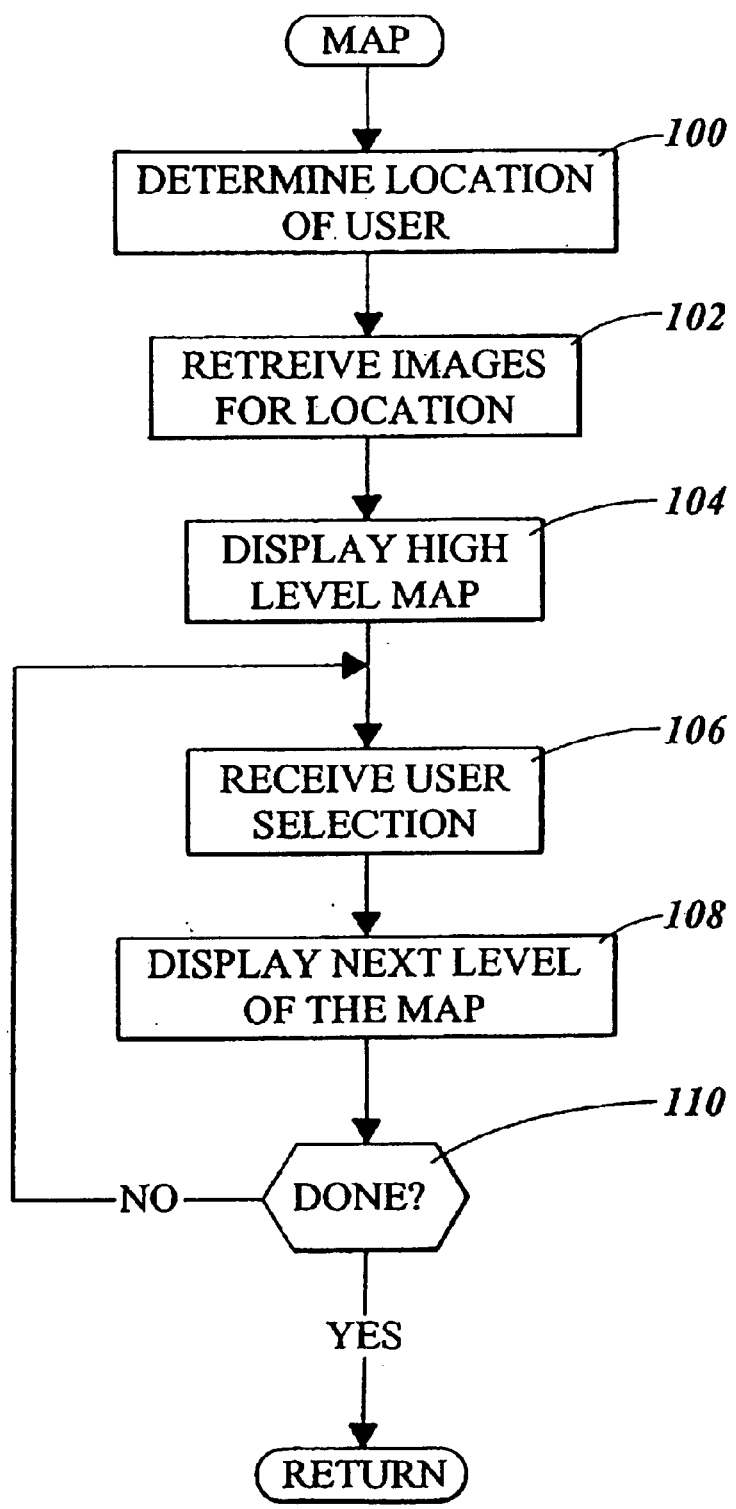
FIG. 5 is a flow chart illustrating the steps that are performed to perform such iterative navigation of a map.

Depending on the application, the display of the next level map 72 may be the last map. Thus, a check is made to see whether the lowest level has been reached or not (see step 110 in FIG. 5). Otherwise, if the application is not done, the application waits for user selection. In the example case depicted in FIG. 4A, suppose that user selects the seven button 76 to obtain a more detailed map of region 74. This more detailed map 78 is depicted in FIG. 4B. The user then next selects the eight button 80 to obtain more detail for the region 82. This results in a still more detailed map 84 as shown in FIG. 4C. As can be seen, steps 106, 108 and 110 of FIG. 5 are repeated in such instances. For example depicted FIG. 4C, the supposed user selects the nine button 88 to obtain a more detailed view of region 86. This results in the bottom level map 90 being displayed (see FIG. 4D). Hence, the application is "done", as checked in step 110 of FIG. 5. The bottom level map 90 depicts sites of interest 92 and 94. These sites may have a visual indication of the map 90 (e.g., see the circles in FIG. 5). The sites of interest 92 and 94 for this example case represent automatic teller machines. The sites may also be sellers of goods, services, landmarks or other types of facilities. The nature of the sites is dependent on the application.

Figure 6:
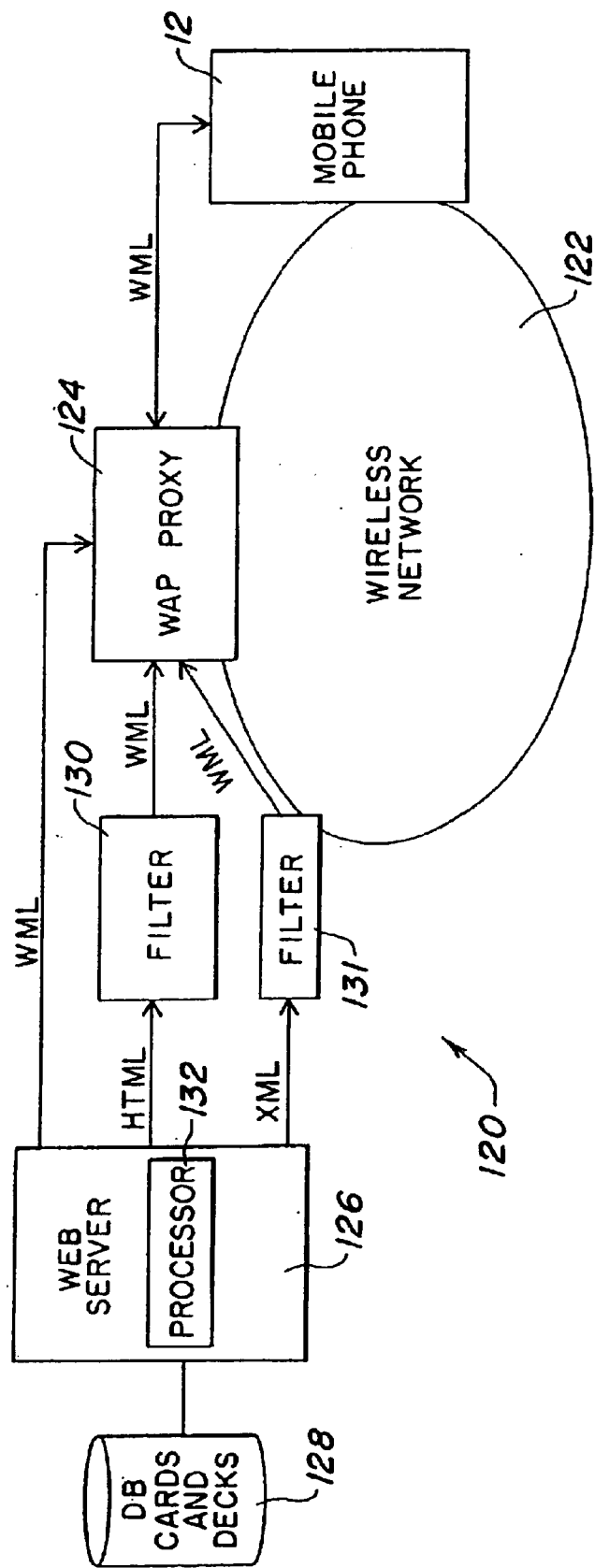
FIG. 6 illustrates components that may be employed in practicing the illustrative embodiment when the electronic device is a mobile phone.

FIG. 6 depicts components that may be employed in a system 120 for practicing the illustrative embodiment on the electronic device of the mobile phone 12. The mobile phone 12 is connected to a wireless network 122. For illustrative purposes, it is presumed that content is provided by a web server 126 that is connected to the internet or another computer network that complies with the TCP/IP protocol suite. The web server 126 communicates with a proxy 124 that is connected to the wireless network 122. It is presumed for illustrative purposes that the wireless access protocol (WAP) is used in this system 120. WAP specifies an application framework and network protocols for wireless devices, such as mobile telephones, pagers and PDA's. The web proxy 124 may be a computing resource that allows the WAP client (i.e., the mobile phone 12) to gain access to services provided by web server 126. The web server 126 includes a processor 132 for executing instructions. The web proxy 124 translates WAP requests to Internet requests. The web proxy 124 also encodes responses from the web server 126 into a format that is understood by the mobile phone 12.

The content that is provided by the web server 126 may be encoded in different formats. For example, the content may be encoded in hypertext mark-up language (HTML) or in the wireless mark-up language (WML). The content may also be encoded in extensible mark-up language (XML) or in other mark-up languages. Still further, the content may be encoded in a format other than a mark-up language that is suitable for passing content over the wireless network 122 to the mobile phone 12. A filter 130 may be provided for converting HTML content into WML and a filter 131 may be provided for converting XML content into WML. The WML content may be forwarded by the WAP proxy 124 over the wireless network 122 to the mobile phone 12. WML employs the notion of a "card," which is a single unit of navigation in user interface. For purposes of the present applications, each card is associated with a single display instance for the display on the electronic device. Hence, the map 70 depicted at FIG. 2A is encoded in a single card. Each card may contain information to present to the user, instructions for gathering user input and mechanism for triggering events. WML also employs the notion of a "deck." A deck is a logical collection of WML cards. Sequences of maps may be partitioned into decks as needed.

Figure 7:
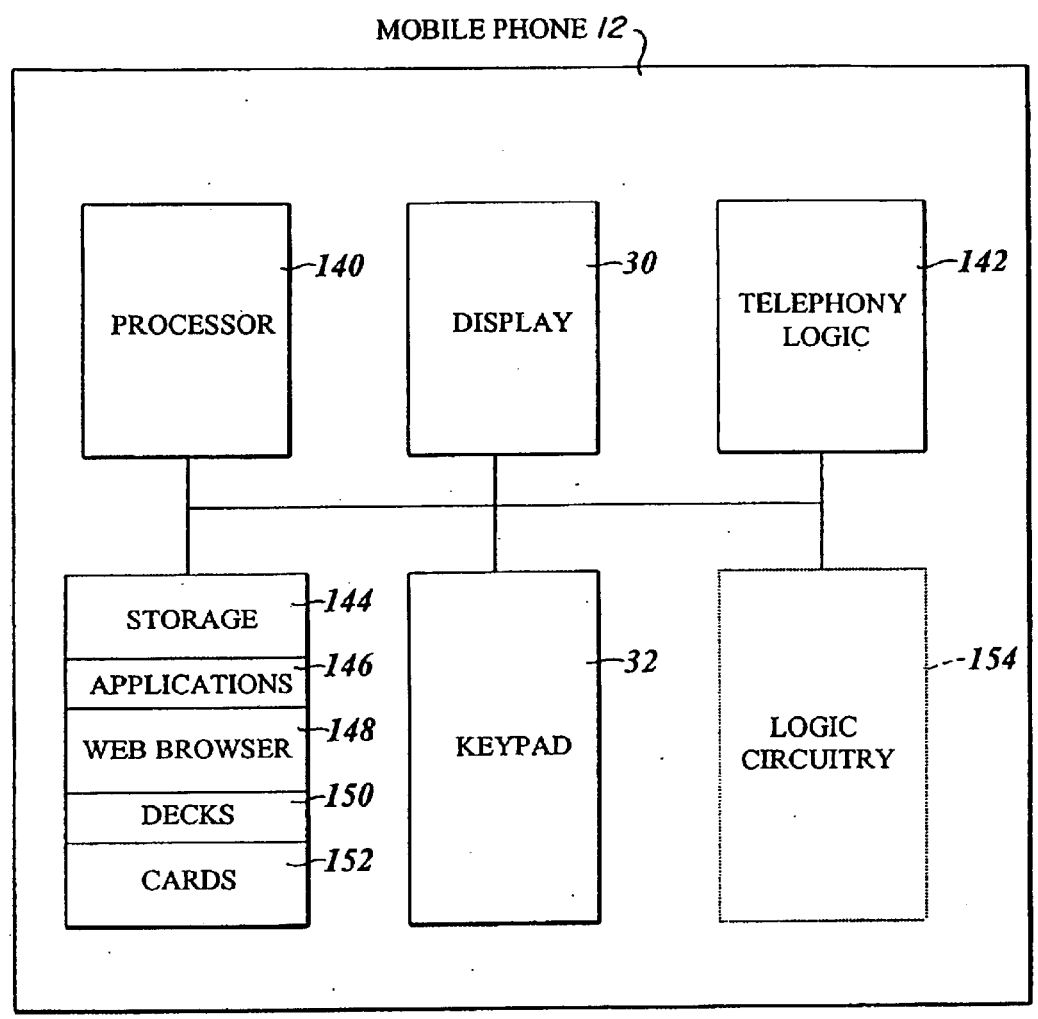
FIG. 7 is a block diagram illustrating components of a mobile phone that are used in the illustrative embodiment.

The web server 126 may have a database 128 that contains cards and decks. These may be forwarded to the mobile phone 12 as needed. When the mobile phone 12 begins an application that requires cards or decks, the information may be forwarded from the database 128 by the web server 126 to be sent to the mobile phone 12 for caching therein. Other content may need to be presented on demand. FIG. 7 provides a high-level block diagram illustrating components for the mobile phone 12. The mobile phone 12 may contain a processor 40 for executing instructions and generally directing activity within the mobile phone 12. As has been mentioned above, the mobile phone 12 includes a display 30 and keypad 32. The mobile phone may contain various telephony logic 142 for providing functionality for the mobile phone 12, such as placing calls and the like. The mobile phone 12 may include a storage 144 for holding programs and data. The programs may include application programs 146 and a web browser 148. The web browser 148 may be a WML browser that enables the user to gain access from the Internet for display on the display 30 on the mobile phone 12. The web browser 148 may contain a WML interpreter and other suitable mechanisms including a cache. The storage 144 may hold buffered decks 150 or cards 152.

It should be appreciated that the illustrative embodiment need not be implemented in software but rather may also be implemented in hardware, firmware or a combination of software, firmware and hardware. In an example depicted in FIG. 7, the mobile phone 12 may include logic circuitry 154 for implementing the functionality described for the illustrative embodiment of the present invention.

Figure 8:
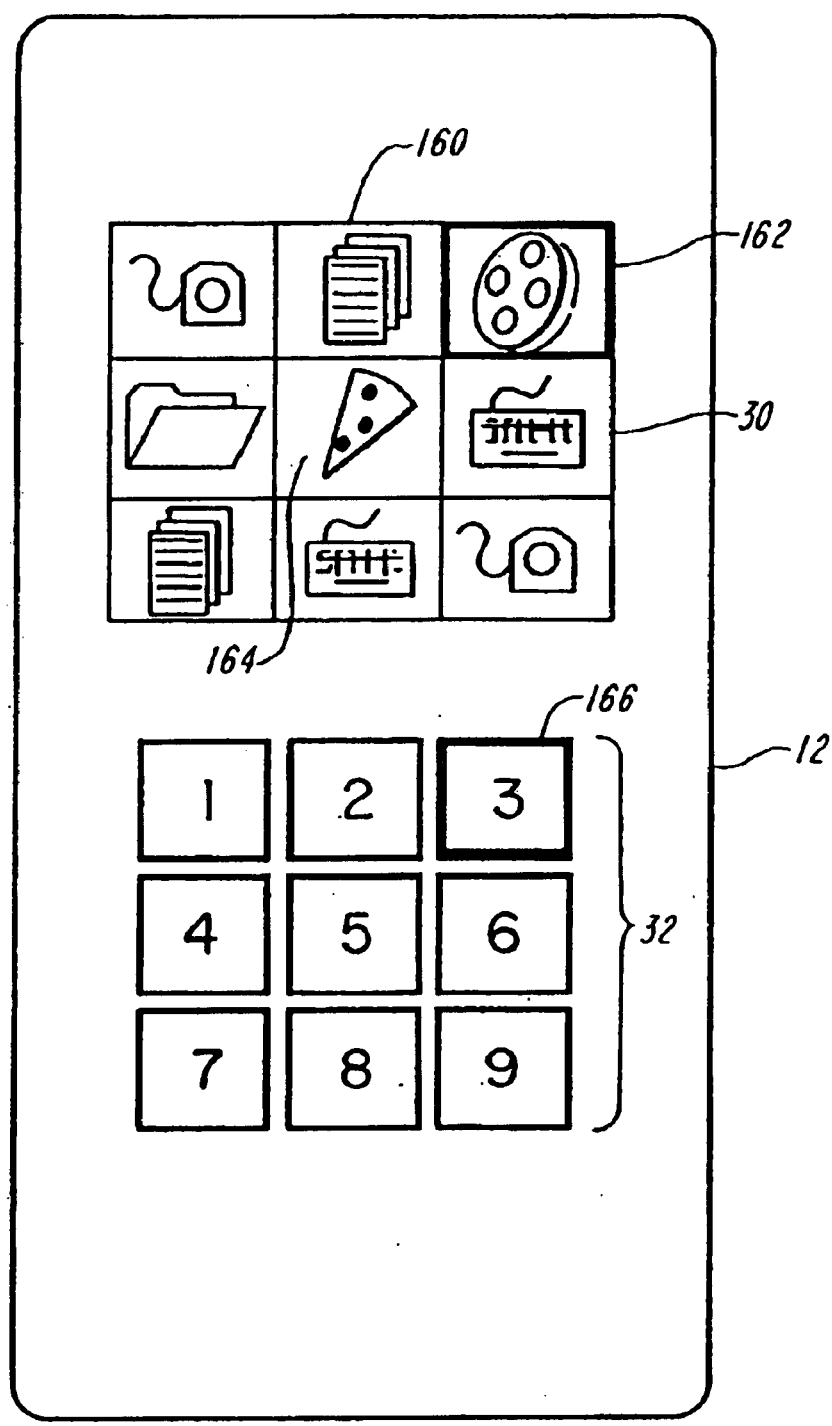
FIG. 8 illustrates an example wherein a display shows service choices.

The illustrative embodiment may also be employed to display service options to a user of an electronic device, such as a mobile phone 12. FIG. 8 depicts an example of a screen display 160 that is shown on display 30 of a mobile phone 12 where each of the regions is associated with a given service option. The service options are identified by graphics. The highlighted region 162 is associated with a film option for locating a nearest movie theater and presenting move times and the like. Option 164 is associated with a service for ordering a pizza. To select the option associated with region 162, the user would select the 3 button 166 shown at FIG. 8.

Figure 9:
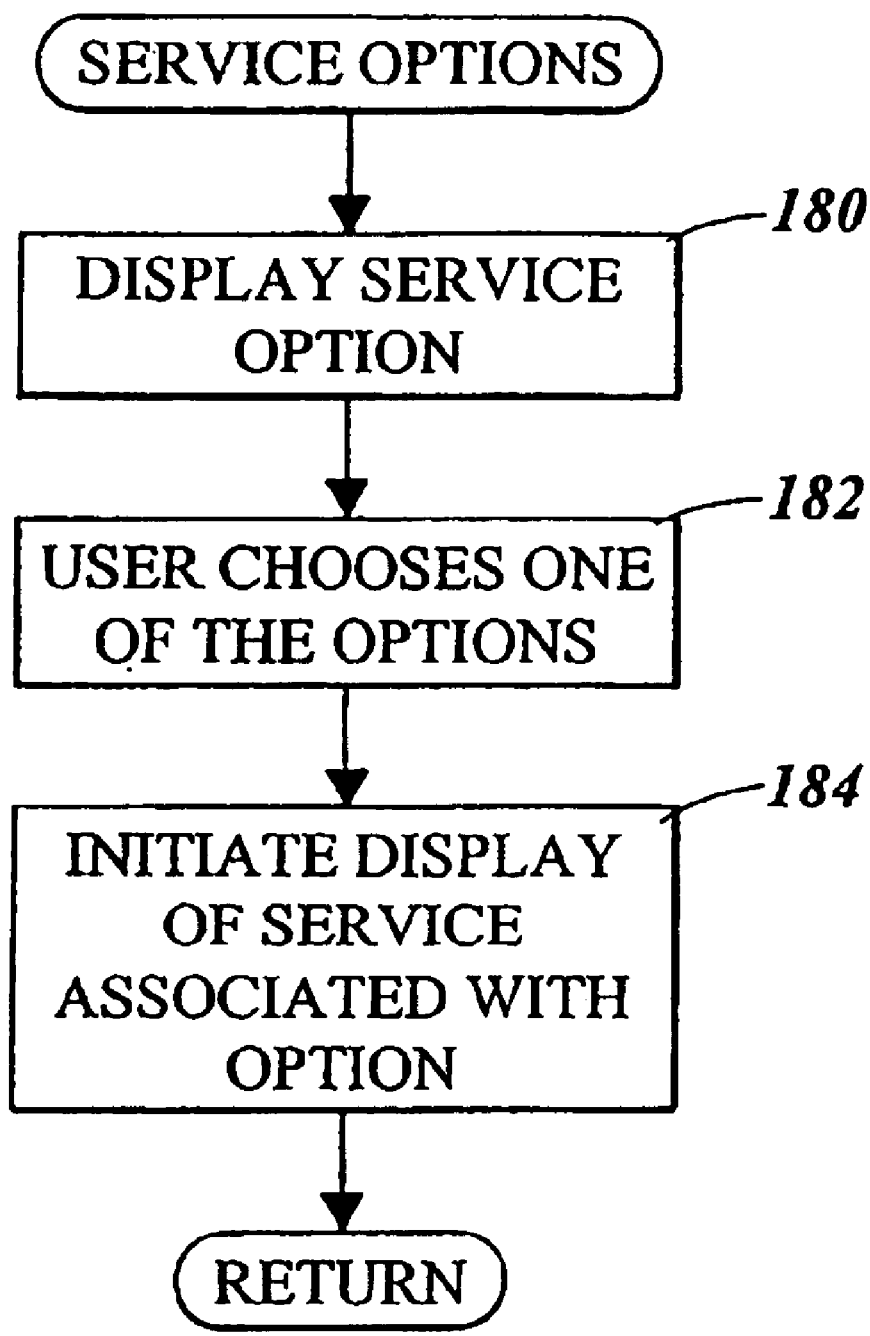
FIG. 9 is a flow chart illustrating the steps that are performed for a user to choose a service option.

FIG. 9 is a flow chart illustrating the steps that are performed for use to gain access to services in the illustrative embodiment. Initially, the service options are displayed on the display (step 180 in FIG. 9). For an example case, depicted FIG. 8, screen 160 is shown on display 30 to itemize the service options. The user then chooses one of the options by selecting an associated key or button (step 182 in FIG. 9). For example, in FIG. 8, the user may press 3 button 166 to select the option associated with region 162. The display of a sequence associated with the option is then initiated (step 184 in FIG. 9). This sequence may vary depending upon the nature of the service that is selected and the nature of the application.

Figure 10:
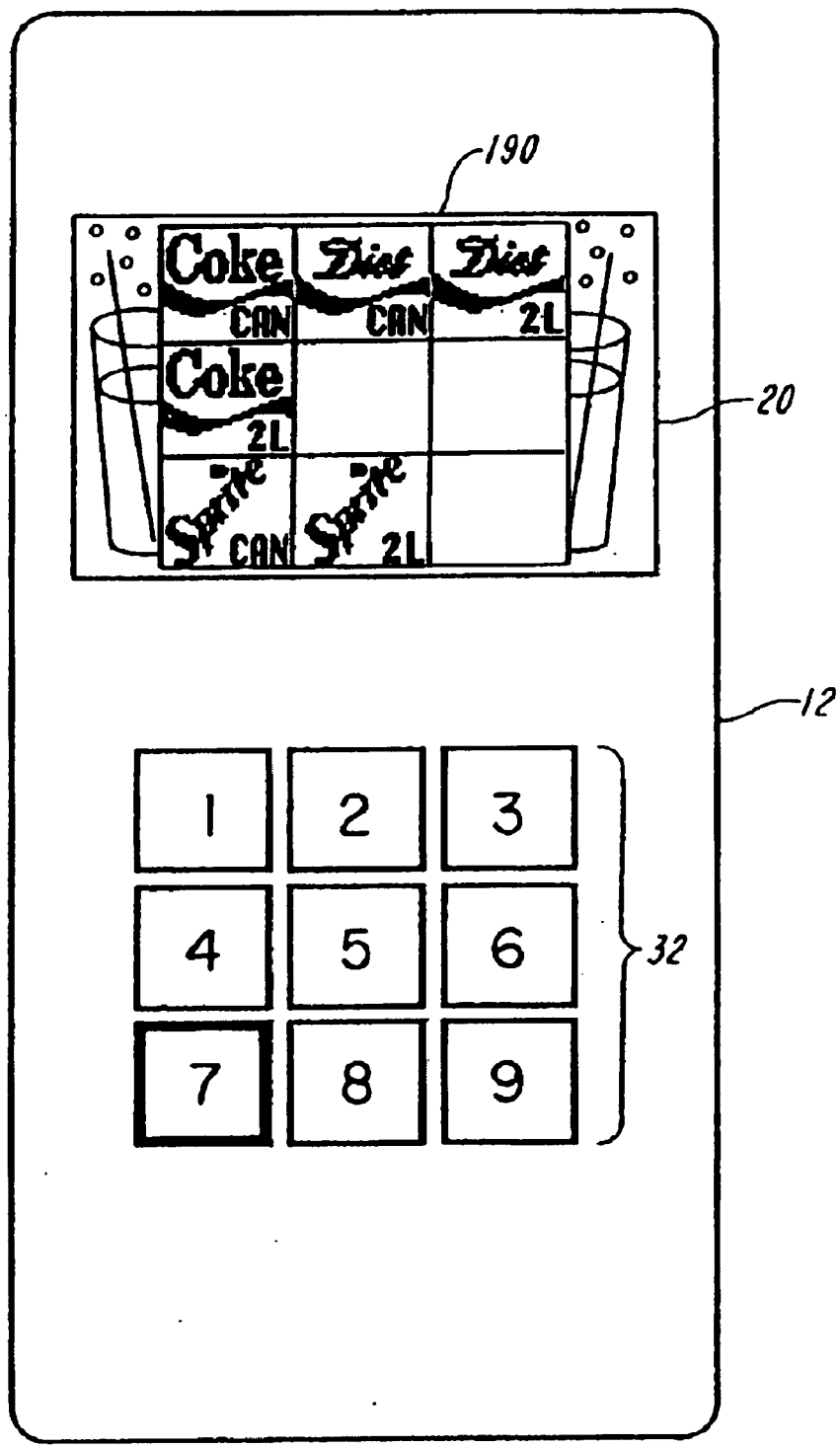
FIG. 10 illustrates an example of the appearance of the display on a mobile phone for purchasing a soft drink.
Figure 11A:
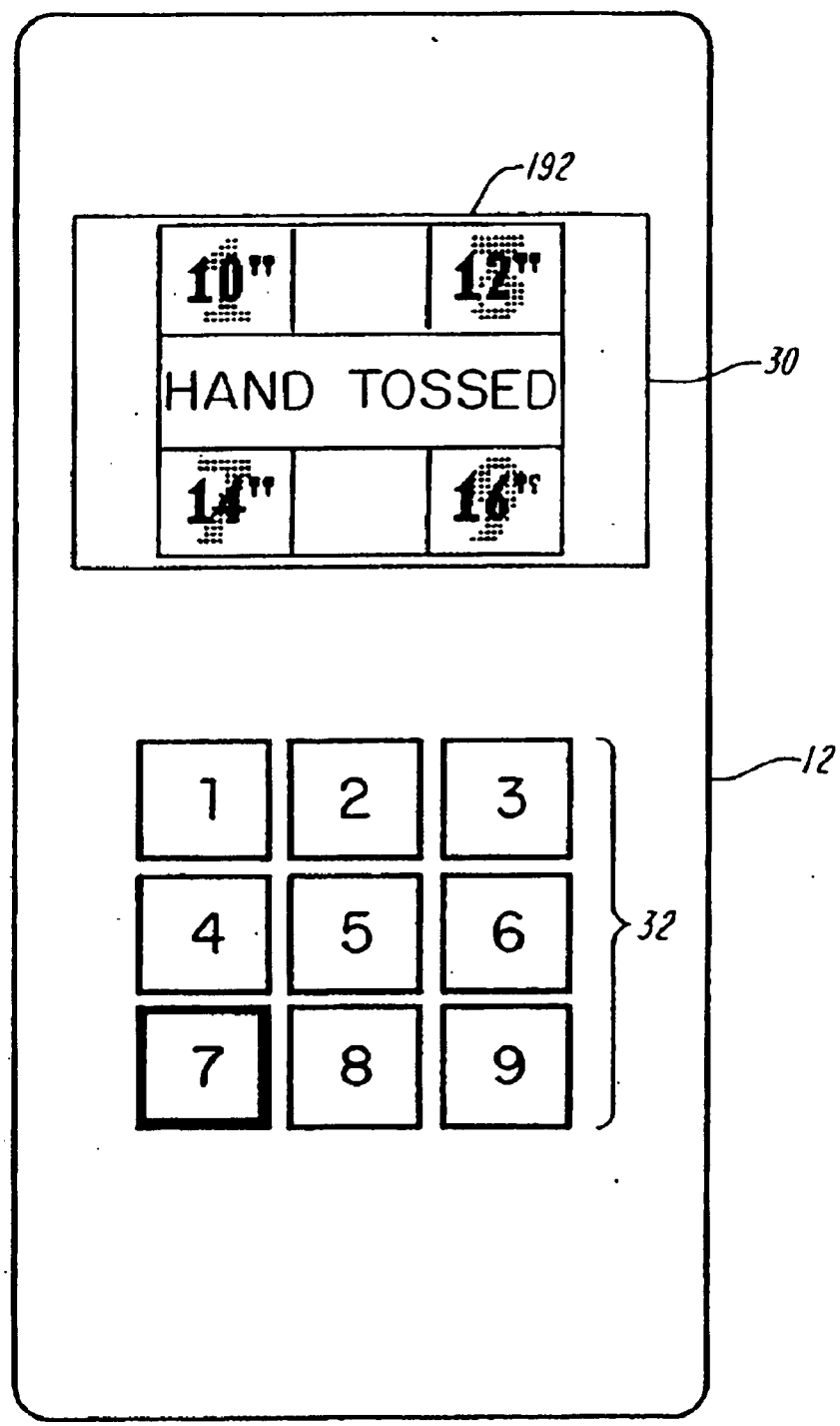
FIGS. 11A and 11B illustrate examples of displays that are shown when a user requests to purchase a pizza.
Figure 11B:
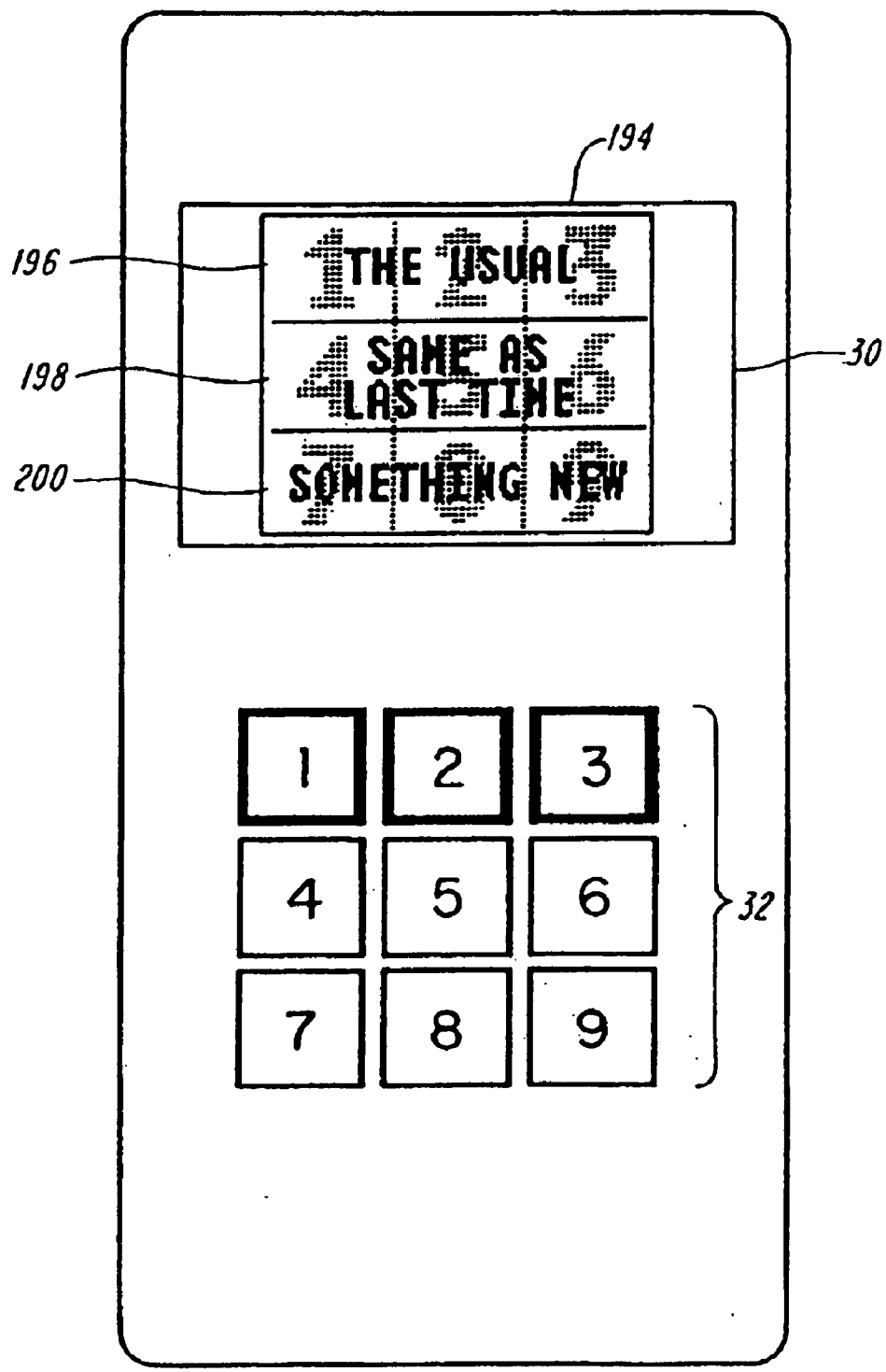

FIG. 10 serves an example screen 190 that may be displayed when the user selects an option to purchase some soda. The user may be presented with a number of different types of soda to purchase and different sizes ranging from a 12 oz. can to a 2-liter bottle. FIG. 11A shows an example of a screen 192 that may be displayed when the user selects the option associated with region 164 of FIG. 8 to order a pizza. The user may be asked by the screen 192 to select the size of the pizza. It is worth noting that there are only 4 options in this case and that the identity of the associated button is shown in phantom form as part of the background of the region on the screen 192. The application may also contain intelligence or simplifying the task of ordering a pizza. As shown in FIG. 11B, the user may be prompted to request "the usual," which refers to what the user typically orders. It is noteworthy that the region 196 is associated with buttons 1, 2 and 3 on the keypad 32. Region 198 prompts the user to order the same pizza as was most recently ordered. This region is associated with button 4, 5 and 6. Lastly region 200 may be selected for the user to order an entirely new pizza. Region 200 is associated with buttons 7, 8 and 9.

Figure 12:
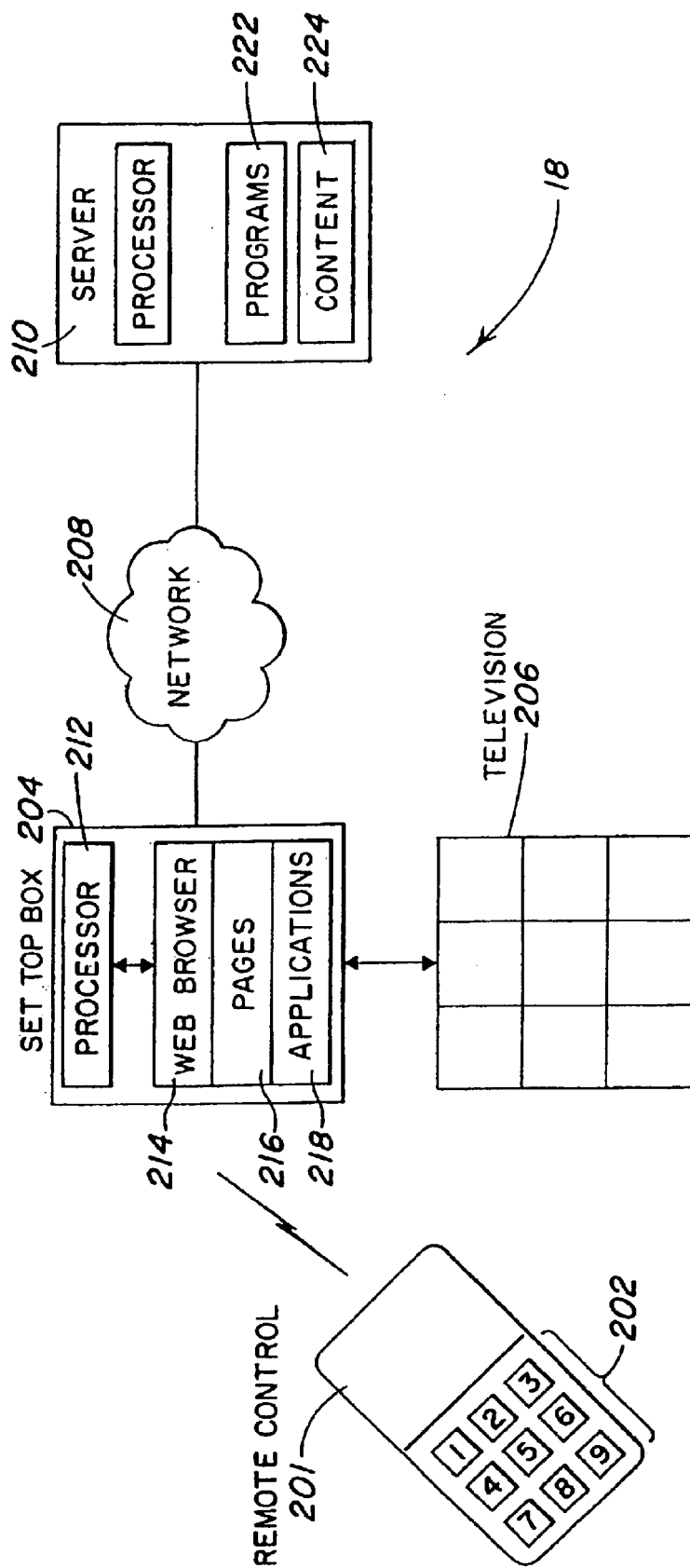
FIG. 12 illustrates components used when the illustrative embodiment is practiced on a television system.

While this discussion has focused primarily on example instances wherein the electronic device is a mobile telephone 12. FIG. 12 depicts an example wherein the electronic device is a television system 18. The television system 18, may be an interactive television system that facilitates access to the Internet. The television system 18 includes a remote control 201 that may communicate with a settop box 204 by way of a wireless communication path. The remote control 201 may, for example, communicate with a settop box 204 by way of infra-red communications. Remote control 201 includes a keypad 202. For example depicted in FIG. 12, the keypad 202 contains keys numbered 1 through 9. The keypad may also contain additional keys and those skilled in the art will appreciate the keypad need not be numbered but rather may contain another sequence of characters or keys. The settop box 204 contains a processor 212 upon which a web browser 214 may operate to render web pages 216 on a television 206. The display in the television 206 is presumed in the illustrative embodiment to be partitioned into logical regions, as has been discussed above. For the example depicted in FIG. 12, the television 206 has a display that is partitioned into nine regions associated with the nine buttons. This is intended to be merely illustrative and not limiting of the present invention. The processor 212 may also have access to pages of content 216. These may be HTML pages, XML pages or pages in a suitable content for rendering on the television 206 by the settop box 204. Various application programs 218 may also be operative on the processor 212. The settop box 204 communicates over a network 208, such as a cable network or a combination of a cable network and a computer network to gain access to a server 210. The server 210 may, for example, be resident at a cable station. The server 210 includes a processor 220 that executes programs 222 for interacting with a settop box 204. The server 210 may also have access to content 224 such as the pages 216 that are rendered by the television 206 in other varieties of content.

An instance of a television system 18 is shown in FIG. 12. The display is on the television 206 and the keypad 202 is on the remote control 200. Those skilled in the art will also appreciate there may be instances where the keypad is on the settop box 204. The display shown on the television 206 is logically partitioned into regions that are associated with the keys in the keypad 202 of the remote control 201 so as to provide the behavior such as has been described above.

While the present invention has been described with reference to an illustrative embodiment thereof, those skilled in the art will appreciate that various changes in form and detail may be made without departing from the intended scope of the present invention as defined in the appended claims.

What is claimed is:

1. In a portable electronic apparatus having a display and a numbered keypad having keys, a method comprising the steps of:

displaying information on the display of said portable electronic apparatus so that the display is visually partitioned in regions, wherein each region is associated with at least one of the keys on the numbered keypad, each of said keys corresponding to at most a single region of said display, said information being wirelessly received by said portable electronic apparatus from an information provider, said information transmitted for display on said portable electronic apparatus, and wherein each region provides a visual indication of a selection associated with selecting the key on the number keypad; and in response to selection of a selected one of the keys on the numbered keypad, triggering an event, wherein each region is associated with a service and wherein the selection of the selected key triggers information being displayed on the display that concerns a service associated with the selected key.

2. The method of claim 1, wherein the keys in the numbered keypad are configured in a pattern and wherein the regions are arranged on the display to match the pattern in which the keys are configured.

3. The method of claim 1, wherein the regions contain graphical information.

4. The method of claim 3, wherein the regions contain text.

5. The method of claim 1, wherein the regions contain text.

6. The method of claim 1, wherein the portable electronic apparatus is a telephone.

7. The method of claim 1, wherein the portable electronic apparatus is a pager.

8. The method of claim 1, wherein the portable electronic apparatus is a personal digital assistant (PDA).

9. The method of claim 1, wherein the portable electronic apparatus is a remote control device configured to operate at least one of a television and television set top box.

10. The method of claim 1, wherein the portable electronic apparatus is an Internet appliance.

11. The method of claim 1, wherein the step of triggering an event comprises displaying new information on the display wherein the new information is associated with the selected key on the numbered keypad.

12. The method of claim 11, wherein the new information that is displayed on the display is visually partitioned into regions that are each associated with respective ones of the keys on the numbered keypad.

13. The method of claim 1, wherein there are at least five regions.

14. The method of claim 13, wherein there are nine regions associated with respective keys numbered one through nine.

15. The method of claim 1, wherein each of the regions contains a border for visually delimiting the regions.

16. The method of claim 1, wherein the regions occupy substantially all of the display.

17. The method of claim 1, wherein each region is associated exclusively with a single one of the keys in the numbered keypad.

18. In a mobile telephone having a display and a numbered keypad containing keys, a method comprising the steps of:

displaying information on the display of said mobile telephone so that the display is visually partitioned into at least two regions, wherein each region is associated with at least one of the keys in the numbered keypad and represents a choice of an option that may be selected by selecting the associated key, each of said keys corresponding to at most a single region of said display, said mobile telephone receiving said information over a wireless network from an information provider, said information transmitted for display on said mobile telephone, and wherein the display is organized in a configuration that corresponds to a configuration of the keys on the numbered keypad; and responding to selection of a selected one of the keys on the numbered keypad, by taking an action, said action associated with said choice of an option.

19. The method of claim 18, wherein each region is associated with a service option for a service and selecting the selected key results in a request for the service.

20. The method of claim 18, wherein each region contains a graphical element that visually represents a choice.

21. The method of claim 18, wherein each region fails to display a number of the key on the numbered keypad that is associated with the region.

22. The method of claim 18, wherein the step of responding comprises displaying information associated with selection of the selected key.

23. The method of claim 18, wherein the step of responding comprises placing a phone call.

24. The method of claim 18, wherein the step of responding comprises rendering a wireless markup language (WML) card on the display.

25. The method of claim 18, wherein said action comprises taking the further steps of:

displaying a second grouping of information so that the display is visually partitioned into at least two regions, wherein each region is associated with at least one of the keys in the numbered keypad and represents a choice of an option that may be selected by selecting the associated key, each of said keys corresponding to at most a single region of said display, said mobile telephone receiving said information over a wireless network from an information provider, wherein the display is organized in a configuration that corresponds to a configuration of the keys on the numbered keypad; and responding to selection of a selected one of the keys on the numbered keypad, by taking an action.

26. A storage medium for use in a portable electronic apparatus having a display and a numbered keypad having keys, said medium holding instructions for performing a method, comprising the steps of:

displaying information on the display of said portable electronic apparatus so that the display is visually partitioned in regions, wherein each regions is associated with at least one of the keys on the numbered keypad, each of said keys corresponding to at most a single region of said display, said information being wirelessly received by said portable electronic apparatus from an information provider, said information transmitted for display on said portable electronic apparatus, and wherein each region provides a visual indication of a selection associated with selecting the key on the number keypad; and in response to selection of a selected one of the keys on the numbered keypad, triggering an event, wherein each region associated with a service and wherein the selection of the selected key triggers information being displayed on the display that concerns a service associated with the selected key.

27. The storage medium of claim 26, wherein the keys in the numbered keypad are configured in a pattern and wherein the regions are arranged on the display to match the pattern in which the keys are configured.

28. The storage medium of claim 26, wherein the step of triggering an event comprises displaying new information on the display wherein the new information is associated with the selected key on the numbered keypad.

29. The storage medium of claim 28, wherein the new information that is displayed on the display is partitioned into regions that are each associated with respective ones of the keys on the numbered keypad.

30. The storage medium of claim 26, wherein each of the regions contains a border for visually delimiting the regions.

31. The storage medium of claim 26, wherein said portable electronic apparatus is one of a mobile phone, PDA and remote control device configured to operate at least one of a television and television set top box.

32. A storage medium for use in a mobile telephone having a display and a numbered keypad containing keys, said storage numbered keypad containing keys, said storage medium holding instructions for performing a method, comprising the steps of:

displaying information on the display of said mobile telephone so that the display is visually partitioned into at least two regions, wherein each region is associated with at least one of the keys in the numbered keypad and represents a choice of an option that may be selected by selecting the associated key, each of said keys corresponding to at most a single region of said display, said mobile telephone receiving said information over a wireless network from an information provider, said information transmitted for display on said mobile telephone, wherein the display is organized on the-display in a configuration that corresponds to a configuration of the keys on the numbered keypad; and responding to selection of a selected one of the keys on the numbered keypad, by taking an action, said action associated with said choice of an option.

33. The medium of claim 32, wherein each region is associated with a service option for a service and selecting the selected key results in a request for the service.

34. The medium of claim 32, wherein each region contains a graphical element that visually represents a choice.

35. The medium of claim 32, wherein each region fails to display a number of the key on the numbered keypad that is associated with the region.

36. The medium of claim 32, wherein the step of responding comprises displaying information associated with selection of the selected key.

37. The medium of claim 32, wherein the step of responding comprises placing a phone call.

38. The medium of claim 32, wherein the step of responding comprises rendering a wireless markup language (WML) card on the display.

39. The medium of claim 32, wherein said method comprises the further steps of:

displaying a second grouping of information so that the display is visually partitioned into at least two regions, wherein each region is associated with at least one of the keys in the numbered keypad and represents a choice of an option that may be selected by selecting the associated key, each of said keys corresponding to at most a single region of said display, said mobile telephone receiving said information over a wireless network from an information provider, wherein the display is organized in a configuration that corresponds to a configuration of the keys on the numbered keypad; and responding to selection of a selected one of the keys on the numbered keypad, by taking an action.

* * * * *

UNITED STATES PATENT AND TRADEMARK OFFICE
CERTIFICATE OF CORRECTION

PATENT NO. : 6,731,316 B2
DATED : May 4, 2004
INVENTOR(S) : Herigstad et al.

It is certified that error appears in the above-identified patent and that said Letters Patent is hereby corrected as shown below:

Title page,
Item [54], Title, please replace "GRAPICAL LAYOUT AND KEYPAD RESPONSE TO VISUALLY DEPICT AND IMPLEMENT DEVICE FUNCTIONALITY FOR INTERACTIVITY WITH A NUMBERED KEYPAD" with -- KEYPAD DRIVEN GRAPHICAL USER INTERFACE FOR A PORTABLE DEVICE".

Signed and Sealed this

Twenty-seventh Day of July, 2004

JON W. DUDAS
*Acting Director of the United States Patent and Trademark Office*